Feb. 9, 1971

M. E. LEVIN 3,561,229

COMPOSITE IN-LINE WEIR AND SEPARATOR FOR
VAPORIZATION COOLED POWER TUBES
Filed June 16, 1969

INVENTOR.
MARTIN E. LEVIN
BY
Stanley B. Cole
ATTORNEY

3,561,229
COMPOSITE IN-LINE WEIR AND SEPARATOR FOR VAPORIZATION COOLED POWER TUBES

Martin E. Levin, Burlingame, Calif., assignor to Varian Associates, Palo Alto, Calif., a corporation of California
Filed June 16, 1969, Ser. No. 833,654
Int. Cl. F25b 4/04
U.S. Cl. 62—218                           8 Claims

ABSTRACT OF THE DISCLOSURE

A vaporization cooling system for cooling the collector structure of a beam power tube is disclosed. The system includes a composite weir and vapor separator connected in-line between a beam collector boiler and a vapor condenser. The composite weir and separator includes a chamber with a reentrant conduit for directing emulsified coolant from the boiler against a deflector for separating the vapor from the liquid coolant. The vapor is directed to the condenser and the liquid is stored in a weir portion of the chamber and fed by gravity back to the boiler to maintain a safe liquid level in the boiler.

DESCRIPTION OF THE PRIOR ART

Heretofore, vaporization cooling ssytems for cooling the beam collector structures of beam power tubes have included a vapor separator, typically as a part of the boiler structure, and a separate weir for maintaining the liquid coolant at a safe level within the boiler. Such a prior art cooling system is disclosed in U.S. Pat. 2,969,957, issued Jan. 31, 1961. In such prior systems, the vapor separator tended to be a relatively complicated structure including specially shaped vanes surrounding the collector for separating the vapor from the liquid by centrifugal force. Moreover, since the separator was included as a portion of the boiler each different sized boiler for different sized tubes required a different sized separator. Therefore a need exists for a simplified vapor separator system.

SUMMARY OF THE PRESENT INVENTION

The principal object of the present invention is the provision of an improved vapor separator and weir for use in a vaporization cooling system to cool a beam collector structure of a power tube.

One feature of the present invention is the provision of a composite vapor separator and weir for connection in-line between a beam collector boiler and a vapor condenser, whereby the cooling system is simplified.

Another feature of the present invention is the same as the preceding feature wherein the composite vapor separator and weir includes a chamber having a reentrant conduit for directing a stream of emulsified coolant derived from the boiler against a deflector for separating the vapor from the liquid and for directing the liquid into a weir portion of the chamber defined by the region surrounding the reentrant conduit.

Another feature of the present invention is the same as the preceding feature wherein the reentrant conduit is apertured near its base to provide a gravity feed liquid passageway communicating between the weir and the boiler to maintain a safe liquid level in the boiler.

Another feature is the same as any one or more of the preceding features including the provision of a liquid level sensor for sensing an unsafe liquid level in the weir.

Other features and advantages of the present invention will become apparent upon a perusal of the following specification taken in connection with the accompanying drawings wherein:

DESCRIPTION OF THE PREFERRED EMBODIMENTS

Figure 1:
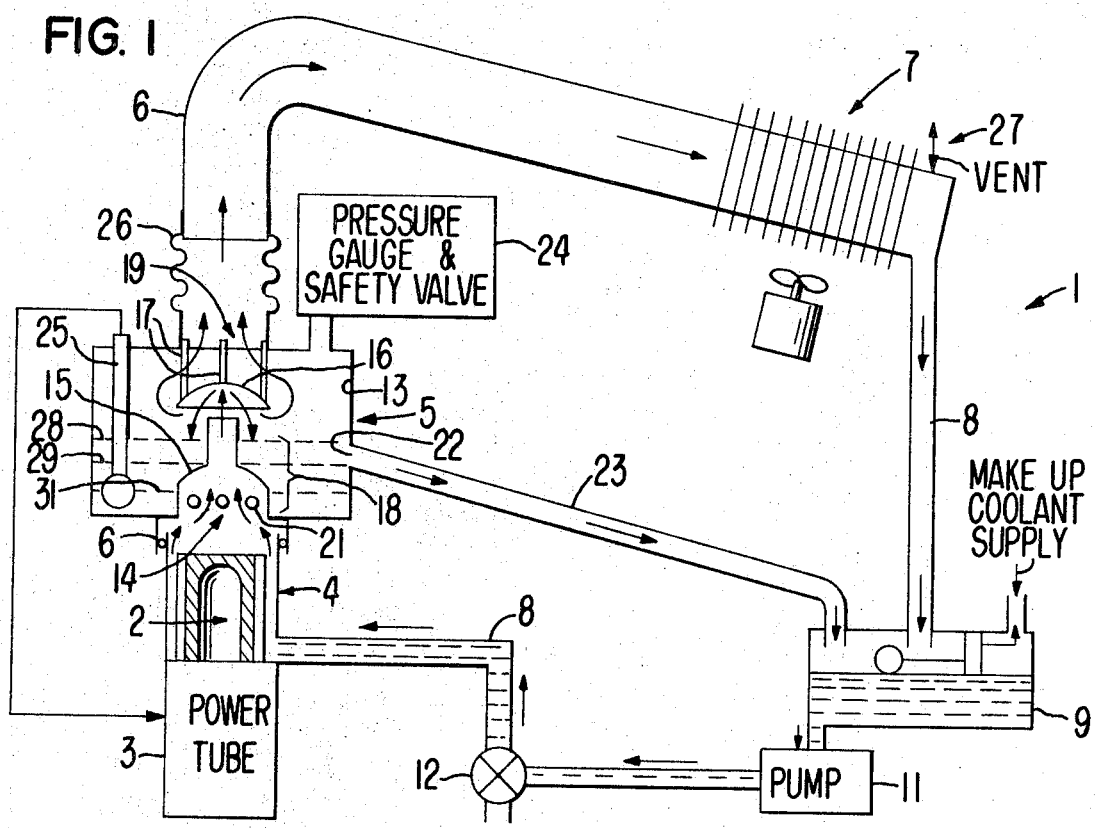
FIG. 1 is a schematic line diagram, partly in block diagram form, depicting a cooling system of the present invention.

Referring now to FIG. 1, there is shown a vaporization cooling system 1 of the present invention. The beam collector structure 2 of a beam power tube 3, such as a 40 to 200 kw. input power UHF klystron amplifier, is immersed in liquid coolant, such as purified and deionized water contained within a boiler 4. A composite vapor separator and weir 5 is series connected in-line in a conduit 6, as of 6" ID steam pipe, interconnecting the boiler 4 with a heat exchanging vapor condenser 7. Liquid coolant condensed by condenser 7 is returned to the boiler 4 via return line 8 which includes a series connection of a make-up reservoir 9, pump 11, and drain valve 12.

The composite vapor separator and weir 5 includes a hollow cylindrical chamber 13, as of 10" in diameter and 9" long, elevated above the level of the boiler 4. The bottom wall of the chamber 13 includes a centrally disposed input port 14, as of 6" ID. An inverted funnel-shaped conduit 15 projects reentrantly into the chamber 13 from the marginal lip of the input port 14.

A concave deflector 16 is supported via a plurality of support legs 17 from the upper wall of the chamber 13. The center of the deflector 16 is positioned on the axis of the conduit 15 such that the liquid constituent of the emulsified coolant, as carried from the boiler 4 into the chamber 13 via conduit 15, is deflected downwardly around the outside of the conduit 15 into a liquid weir portion 18 of the chamber 13. The weir portion 18 of the chamber 13 is defined by the lower region of the chamber 13 which surrounds the reentrant conduit 15. The vaporized constituent of the emulsified coolant, such as steam, escapes around the periphery of the deflector 16 and out an output port 19 in the top wall of the chamber 13 to the condenser 7 via conduit 6. The inverted funnel-shape of the conduit 15 serves to compress the diameter of the upwardly rising stream of emulsion and to increase its velocity, thereby enhancing the vapor separation function of the deflector 16.

A plurality of apertures 21 are provided in the side wall of the funnel-shaped reentrant conduit 15 at the wide end thereof near the bottom of the weir to provide a passageway for gravity flow of liquid coolant from the weir 18 to the boiler 4. In addition, a side port 22 in the weir 18 is connected to an overflow line 23 for circulating liquid coolant from the weir 18 to the boiler 4 via make-up reservoir 9, pump 11 and conduit 8.

A pressure gauge and safety valve 24 are connected to the chamber 13 for monitoring the pressure therein and for venting excess pressure to the atmosphere. A liquid level sensor 25 is provided in the chamber 13 for monitoring a low liquid level of the weir 18. An output of the sensor 25, is employed for shutting down the power tube 3 or for preventing beam voltage from being applied to the tube if the liquid level in the weir is at an unsafe level. An elastic bellows 26, as of rubber, interconnects conduit 6 to the upper port 19 of the chamber 13 to facilitate in-line connection of the composite separator and weir 5. The condenser 7 is vented at 27 near its output end to the atmosphere to permit the system to breathe freely in either direction from the vent to equalize starting and stopping pressure transients.

In operation, the pump 11 is started, the weir is filled with coolant to the overflow port 22 and a continuous flow of coolant to the boiler 4 is produced. Overflow from the weir 18 is extracted through port 22 and overflow line 23. The overflow line 23 is immersed in the reservoir 9 by an amount equal to the back pressure head present in the boiler 4 to prevent escape of vaporized coolant. The speed of pump 11 is adjusted to provide a small amount of overflow (0.1 gallon per minute is adequate) at the maximum dissipation level to be encountered which results in a liquid flow rate to the boiler 4 from the reservoir 9 and pump 11 of about 0.07 gallon per minute per every 10 kw. of power dissipation by the beam collector 2 plus the overflow. Excessive overflow, i.e., greater than 2 gallons per minute, may cause flooding of the weir 18 and degradation of the vapor separating capability of the vapor separator.

Upon start up of the power tube 3, the escaping vapor and liquid emulsion rising from the boiler 4 produces a transient surge in the pressure and liquid level within the weir 18 to the level indicated at 28. As the system reaches equilibrium, the liquid level recedes to the level of the overflow port 22, as indicated at 29. If the liquid level recedes to an unsafe level, as indicated at 31, the sensor 25 shuts off the tube 3. Upon shut down, liquid coolant drains via gravity from the weir via drain ports 21 and conduit 6 into the boiler 4 to maintain a safe liquid level in the boiler 4 for immediate restart.

In the positive flow system of FIG. 1 the condenser 7 need not be elevated above the boiler 4. A drain valve 12 is provided to drain the entire system in case the system is shut down and freezing conditions are to be encountered. In the metal parts of the system 1 only copper, nickel, bronze, Monel, Inconel, 304 or 347 stainless steel materials should be used to avoid contamination of the coolant.

Figure 2:
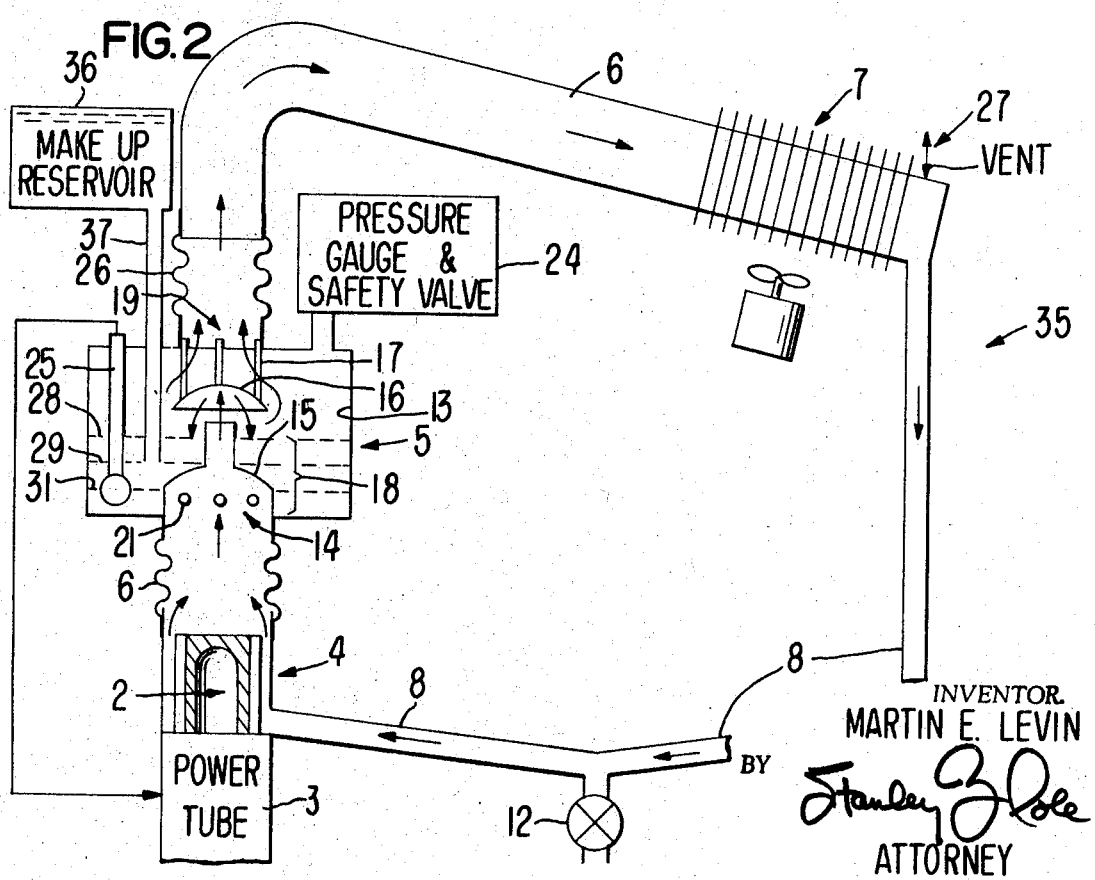
FIG. 2 is diagram similar to that of FIG. 1 depicting an alternative embodiment of the present invention.

Referring now to FIG. 2, there is shown an alternative gravity fed vaporization cooling system 35 of the present invention. The system is essentially the same as that of FIG. 1 except that the overflow return line 23, reservoir 9, and pump 11 are replaced by a gravity fed return line 8 connected directly to the input connection at the base of the boiler 4. In this system, the condenser 7 must be elevated above the weir 18. Vapor emerges from the separator at 19 and the condensate from condenser 7 returns by gravity to the bottom of the boiler 4. The weir 18 performs the function of the reservoir 9 of the positive flow system 1 of FIG. 1.

A separate make-up reservoir 36 formed by a rigid airtight container is interconnected to the weir 18 via a non-collapsible, airtight, tubing 37 having an inside diameter of approximately 0.75". The make-up inlet end of the tubing 37 is immersed in the weir 18 to a suitable make-up level 29 to be maintained. If the liquid level in the weir recedes below the end of the tubing 37 air will pass into the tubing 37 during a non-operational interval to release make-up coolant from the reservoir 36 until the liquid level in the weir again covers the end of the tubing 37. The liquid level in the weir is initially adjusted for the desired operating level 29.

Thereafer the system will automatically maintain a suitable range of levels as long as the system is reasonably watertight and the make-up reservoir contains reserve coolant.

Thus the composite vapor separator and weir 5 of the present invention performs the following function. It controls the coolant level in the boiler 4 so that the collector 2 is immersed at all times. It separates the liquid coolant from the vaporized coolant so that essentially dry vaporized coolant emerges from the separator 5. It absorbs transient excess liquid coolant at start up. It supplies adequate coolant to the boiler 4 for immediate restart, as it provides a liquid coolant level interlock for protection of the beam collector 2.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an apparatus for cooling a power beam tube by vaporization of a cooling liquid; means forming a boiler chamber for containing a liquid coolant in which the beam collector structure of a power tube is immersed in heat exchanging relation therewith such that heat generated by collection of the beam causes boiling of the liquid coolant in said boiler chamber for cooling of the collector by latent heat of vaporization of the liquid coolant; means forming a heat exchanging condenser for cooling and condensing the vaporized coolant; means forming a conduit for passing the vaporized coolant from said boiler to said condenser means; means for returning the condensed liquid coolant from said condenser to said boiler chamber; the improvement comprising means forming a composite liquid coolant weir and vapor separator connected in said conduit between said boiler means and said condenser means for separating liquid coolant from the vaporized coolant; said composite weir and separator means being disposed at an elevated position relative to the position of said beam collector within said boiler; said composite weir and separator including, a liquid weir position, means forming a deflector structure, means for directing emulsified coolant derived from said boiler against said deflector means for separating the vaporized coolant from the liquid coolant and for deflecting the liquid coolant to said weir portion and allowing escape of the separated vaporized coolant to said condenser means via said conduit means, means forming a gravity feed liquid passageway communicating between said weir portion of said composite weir and separator and said boiler for feeding liquid back to said boiler.

2. The apparatus of claim 1 including means forming a liquid level sensor disposed in said weir portion of said composite weir and separator for sensing an unsafe liquid coolant level in said weir portion.

3. In a composite in-line weir and vapor separator apparatus for series connection in a conduit interconnecting the boiler and the coolant vapor condenser of the cooling system of a vaporization cooled beam collector structure of a power tube, means forming a chamber to be disposed at an elevation in the cooling system above the level of the beam collector structure being cooled, means forming an input port in the bottom wall of said chamber for connection to a conduit leading to the boiler containing the beam collector to be cooled for passing a vapor and liquid coolant emulsion from said boiler upwardly into said chamber, means forming an output port in the upper wall of said chamber for connection to conduit passing to the coolant condenser, means forming a length of open ended conduit connected in fluid communication with said input port and extending reentrantly into said chamber for directing a stream of the emulsified coolant into said chamber and for defining a liquid weir at the lower portion of the chamber surrounding said reentrant conduit, means forming a deflector structure mounted within said chamber over the reentrant open end of said reentrant conduit for deflecting the liquid coolant constituent of the emulsified coolant into the weir portion of said chamber while allowing the vaporized constituent of the emulsified coolant to escape through said output port to the vapor condenser, and liquid coolant output port means in liquid communication with said weir portion of said chamber for gravity feed of the separated liquid coolant from said reservoir back to the boiler to maintain a safe liquid coolant level in the boiler.

4. The apparatus of claim 3 wherein said reentrant conduit is tapered from a relatively wide opening at the bottom of said chamber to a smaller opening at the upper end thereof for increasing the velocity of the upwardly directed stream of emulsified coolant.

5. The apparatus of claim 4 wherein said deflector means includes a concave deflecting face with the center of the concave face being disposed in axial alignment with said reentrant conduit for deflecting the liquid constituent of the emulsified coolant back around the outside of said conduit.

6. The apparatus of claim 4 wherein said liquid output port means communicating with said weir comprises a plurality of apertures in the wall of said reentrant conduit, such apertures being located near the bottom end of said reentrant conduit.

7. The apparatus of claim 6 including means for sensing a low liquid level in said weir portion of said chamber.

8. The apparatus of claim 5 wherein said input port, output port, reentrant conduit, and deflector means are all axially aligned.

References Cited

UNITED STATES PATENTS

| | | | |
|---|---|---|---|
| 2,440,556 | 4/1948 | Palmer | 62—259 |
| 2,873,954 | 2/1959 | Protze | 62—259 |
| 2,935,306 | 5/1960 | Beurtheret | 62—259 |
| 3,298,431 | 1/1967 | Weaver | 62—119 |

WILLIAM J. WYE, Primary Examiner

U.S. Cl. X.R.

62—119, 259